United States Patent
Kim

(10) Patent No.: US 10,200,107 B2
(45) Date of Patent: *Feb. 5, 2019

(54) INTERFERENCE CANCELLATION REPEATER WITH GAIN CONTROL

(71) Applicant: SOLiD, INC., Seongnam-si, Gyeonggi-do (KR)

(72) Inventor: Hyunchae Kim, Seoul (KR)

(73) Assignee: SOLiD, INC., Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/540,615

(22) PCT Filed: Dec. 4, 2015

(86) PCT No.: PCT/KR2015/013241
§ 371 (c)(1),
(2) Date: Sep. 6, 2017

(87) PCT Pub. No.: WO2016/108449
PCT Pub. Date: Jul. 7, 2016

(65) Prior Publication Data
US 2017/0366247 A1 Dec. 21, 2017

(30) Foreign Application Priority Data
Dec. 30, 2014 (KR) .................. 10-2014-0194357
Apr. 8, 2015 (KR) .................. 10-2015-0049639

(51) Int. Cl.
*H04B 7/15* (2006.01)
*H04B 7/155* (2006.01)
*H04W 28/04* (2009.01)

(52) U.S. Cl.
CPC ..... *H04B 7/15507* (2013.01); *H04B 7/15578* (2013.01); *H04B 7/15585* (2013.01); *H04W 28/04* (2013.01)

(58) Field of Classification Search
CPC ............ H04B 7/15585; H04B 7/15564; H04B 7/15578; H04B 17/318; H04B 7/15535;
(Continued)

(56) References Cited

U.S. PATENT DOCUMENTS 7,486,933 B2 * 2/2009 Lee .................. H04B 7/15564
455/311
9,941,951 B2 * 4/2018 Jang .................. H04B 7/15585
(Continued)

FOREIGN PATENT DOCUMENTS

KR 10-2007-0106363 A 11/2007
KR 10-2011-0040201 A 4/2011

OTHER PUBLICATIONS

Notice to Submit Response for corresponding Korean Patent Application No. 10-2015-0049639, dated Jan. 31, 2017.
(Continued)

*Primary Examiner* — Philip Sobutka
(74) *Attorney, Agent, or Firm* — Sughrue Mion, PLLC

(57) ABSTRACT

An interference cancellation repeater includes: a first transmission/reception processing unit configured to convert a radio frequency (RF) input signal input via a link antenna communicatively coupled to a base station into a digital input signal; an interference canceller configured to cancel an interference signal from the digital input signal and to output an interference canceled signal; a second transmission/reception processing unit configured to convert the interference canceled signal into an RF output signal and to amplify the RF output signal; and a gain controller configured to detect a gain change of the interference cancellation repeater based on the interference canceled signal and to change a current gain of the interference cancellation repeater to a target gain by adjusting intensity of at least one of the RF input signal, the interference canceled signal, and
(Continued)

the RF output signal when the gain change of the interference cancellation repeater is detected.

11 Claims, 5 Drawing Sheets

(58) Field of Classification Search
CPC .............. H04B 1/7107; H04B 7/71072; H04B 7/71075; H04B 7/15
USPC ...................... 455/7–25, 63.1, 296, 302, 310
See application file for complete search history.

(56) References Cited

U.S. PATENT DOCUMENTS

| | | | |
|---|---|---|---|
| 2010/0109771 A1* | 5/2010 | Baik | H04B 7/15585 330/149 |
| 2010/0118922 A1* | 5/2010 | Ahn | H04B 7/15585 375/214 |
| 2011/0195657 A1* | 8/2011 | Takeda | H04B 7/15585 455/7 |
| 2013/0077556 A1* | 3/2013 | Gore | H04B 7/15578 370/315 |

OTHER PUBLICATIONS

International Search Report for PCT/KR2015/013241 dated Apr. 7, 2016.

* cited by examiner

INTERFERENCE CANCELLATION REPEATER WITH GAIN CONTROL

CROSS-REFERENCE TO RELATED APPLICATIONS

This application is a National Stage of International Application No. PCT/KR2015/013241, filed Dec. 4, 2015, and claims priority from Korean Patent Application No. 10-2014-0194357, filed Dec. 30, 2014, and Korean Patent Application No. 10-2015-0049639, filed Apr. 8, 2015, the contents of which are incorporated herein by reference in their entireties.

BACKGROUND

1. Field

The inventive concept relates to an interference cancellation repeater, and more particularly, to an interference cancellation repeater that controls a gain of the interference cancellation repeater to a constant level.

2. Description of the Related Art

Generally, in order to expand service coverage of a base station or to improve service quality, a repeater is used in a radio-shadow area where intensity of a signal is weak or a signal is difficult to reach. The repeater may be a radio frequency (RF) repeater. The RF repeater receives a base station signal transmitted from the base station via a link antenna, amplifies the received base station signal, and then transmits the amplified signal to a terminal via a service antenna, and further receives a signal transmitted from a user terminal via the service antenna, amplifies the received signal, and then transmit the amplified signal to the base station via the link antenna, thereby repeating communication between the base station and the terminal.

The RF repeater is easy to install because the RF repeater transmits and receives signals wirelessly via the link antenna and the service antenna to/from the base station and the user terminal, respectively. However, due to interference between the link antenna and the service antenna, deterioration of a service signal at high power and oscillation by repetitive reception and amplification of the deteriorated signal may occur, and thus an output gain was limited. Also, due to a spatial restriction according to a demand for miniaturization, it was difficult to secure isolation between the link antenna and the service antenna.

As an alternative to this, an interference cancellation repeater has been proposed. The interference cancellation repeater may estimate interference signals, for example, signals that are radiated via the service antenna (or the link antenna) and re-input to the link antenna (or the service antenna) through various paths, and may cancel the interference signals from input signals using the estimated signals, thereby increasing isolation. Accordingly, the interference cancellation repeater may increase an output gain and prevent oscillation, and may be miniaturized.

Meanwhile, when intensity of the interference cancellation repeater is changed for various reasons such as when a service is normally provided after initialization of the interference cancellation repeater, when intensity of a signal transmitted from a base station or a user terminal changes due to environmental influences, and when isolation between a link antenna and a service antenna changes, the interference cancellation repeater secures stability of a service by adjusting the changed gain to an optimum level required for the interference cancellation repeater.

In general, when adjusting a level of a gain corresponding to a gain change, the interference cancellation repeater changes a level of the changed gain immediately to a predetermined level. Here, the interference cancellation repeater cannot estimate interference signals because speed of estimating the interference signals cannot follow the change of the gain level, and thus the interference cancellation repeater cannot cancel the interference signals from an input signal.

SUMMARY

The inventive concept is directed to an interference cancellation repeater capable of stably canceling an interference signal and maintaining a gain at a predetermined level to provide a stable service and constant coverage.

According to an aspect of the inventive concept, there is provided an interference cancellation repeater includes a first transmission/reception processing unit configured to convert a radio frequency (RF) input signal input via a link antenna communicatively coupled to a base station into a digital input signal; an interference canceller configured to cancel an interference signal from the digital input signal and to output an interference canceled signal; a second transmission/reception processing unit configured to convert the interference canceled signal into an RF output signal and to amplify the RF output signal; and a gain controller configured to detect a gain change of the interference cancellation repeater based on the interference canceled signal and to change a current gain of the interference cancellation repeater to a target gain by adjusting intensity of at least one of the RF input signal, the interference canceled signal, and the RF output signal when the gain change of the interference cancellation repeater is detected.

According to an embodiment, the gain controller may be configured to change the current gain of the interference cancellation repeater to the target gain at a constant change rate for a predetermined time.

According to an embodiment, the change rate may be configured to have an integer scale or a log scale.

According to an embodiment, the gain controller may be configured to nonlinearly change the current gain of the interference cancellation repeater to the target gain for a predetermined time.

According to an embodiment, the predetermined time may be divided into a plurality of intervals, and the gain controller may be configured to change the current gain of the interference cancellation repeater to the target gain at different change rates in at least two of the plurality of intervals.

According to an embodiment, the predetermined time may be divided into a plurality of intervals, and the gain controller may be configured to change the current gain of the interference cancellation repeater to the target gain stepwise in the plurality of intervals.

According to an embodiment, the gain controller may include a gain change detector configured to detect a gain change of the interference cancellation repeater based on the interference canceled signal; a target gain calculator configured to calculate a target gain of the interference cancellation repeater when the gain change of the interference cancellation repeater is detected; and a controller configured to gradually change the current gain of the interference cancellation repeater to the calculated target gain by adjusting intensity of at least one of the RF input signal, the interference canceled signal, and the RF output signal.

According to an embodiment, the gain change detector may be further configured to detect the gain change of the interference cancellation repeater based on an administrator's control instruction.

According to an embodiment, the target gain calculator may be configured to calculate the target gain of the interference cancellation repeater based on at least one of magnitude of the interference canceled signal, a maximum output of the interference cancellation repeater, isolation between the link antenna and a user terminal, and administrator's input information.

According to an embodiment, the first transmission/reception processing unit may include a first amplifier configured to amplify the RF input signal by low noise amplification; a first attenuator configured to adjust intensity of the low-noise-amplified RF input signal; and an analog-to-digital converter configured to convert the intensity-adjusted RF input signal into the digital input signal, wherein the gain controller may be configured to adjust the intensity of the RF input signal by controlling the first attenuator.

According to an embodiment, the interference canceller may include a canceller configured to cancel the interference signal from the digital input signal and output the interference canceled signal; and a second attenuator configured to adjust intensity of the interference canceled signal, wherein the gain controller may be configured to adjust the intensity of the interference canceled signal by controlling the second attenuator.

According to an embodiment, the second transmission/reception processing unit may include a digital-to-analog converter configured to convert the interference canceled signal into the RF output signal; a third attenuator configured to adjust intensity of the RF output signal; and a second amplifier configured to amplify the intensity-adjusted RF output signal; the gain controller is configured to adjust the intensity of the RF output signal by controlling the third attenuator.

According to an embodiment of the inventive concept, an interference cancellation repeater may stably estimate and cancel an interference signal by gradually changing a level of a gain that has been changed at the time of a gain change to an optimum gain level required for the interference cancellation repeater and constantly maintaining the same so that a stable service and constant coverage may be provided.

BRIEF DESCRIPTION OF THE FIGURES

A brief description of each drawing is provided to more fully understand drawings recited in the detailed description.

DETAILED DESCRIPTION OF EXEMPLARY EMBODIMENTS

Figure 1:
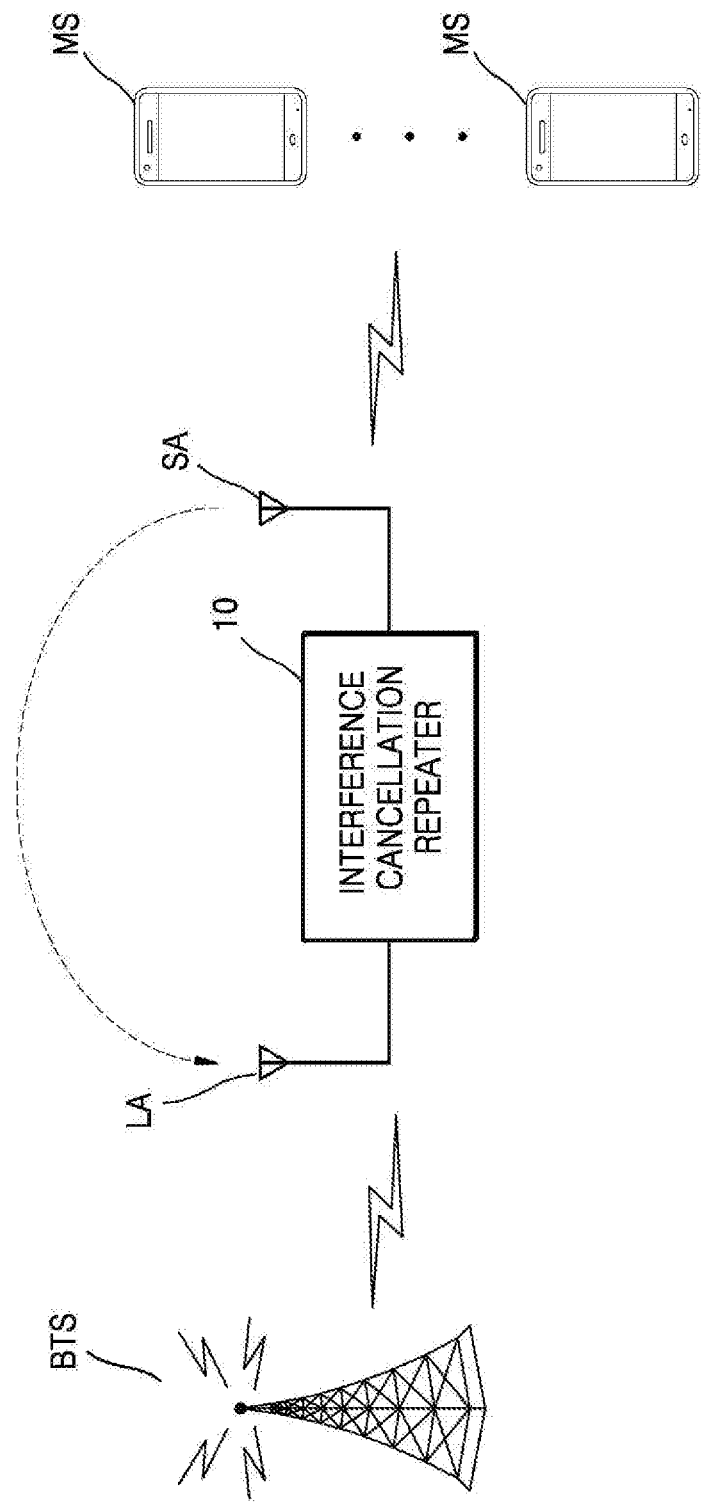
FIG. 1 is a view for explaining a repeat environment of an interference cancellation repeater, according to an embodiment of the inventive concept.

Since the inventive concept may have diverse modified embodiments, preferred embodiments are illustrated in the drawings and are described in the detailed description. However, this does not limit the inventive concept within specific embodiments and it should be understood that the inventive concept covers all the modifications, equivalents, and replacements within the idea and technical scope of the inventive concept.

In the description of the inventive concept, certain detailed explanations of the related art are omitted when it is deemed that they may unnecessarily obscure the essence of the inventive concept. In addition, numeral figures (for example, 1, 2, and the like) used during describing the specification are just identification symbols for distinguishing one element from another element.

Further, in the specification, if it is described that one component is "connected" or "accesses" the other component, it is understood that the one component may be directly connected to or may directly access the other component but unless explicitly described to the contrary, another component may be "connected" or "access" between the components.

In addition, terms including "unit", "er", "or", "module", and the like disclosed in the specification mean a unit that processes at least one function or operation and this may be implemented by hardware or software or a combination of hardware and software.

Moreover, it is intended to clarify that components in the specification are distinguished in terms of primary functions of the components. That is, two or more components to be described below may be provided to be combined to one component or one component may be provided to be divided into two or more components for each more subdivided function. In addition, each of the respective components to be described below may additionally perform some or all functions among functions which other components take charge of in addition to a primary function which each component takes charge of and some functions among the primary functions which the respective components take charge of are exclusively charged by other components to be performed, of course.

An interference cancellation repeater according to an embodiment of the inventive concept may support mobile communication services used worldwide. For example, the interference cancellation repeater may support a time division duplex (TDD) service as well as a frequency division duplex (FDD) service, a very-high frequency (VHF), an ultra-high frequency (UHF), and frequencies of 700 MHz, 800 MHz, 850 MHz, 900 MHz, 1900 MHz, 2100 MHz, and 2600 MHz bands. Furthermore, the interference cancellation repeater may support a number of mobile communication services such as a typical analog mobile communication service, that is, an advanced mobile phone service (AMPS), digital time-division multiple access (TDMA), code-division multiple access (CDMA), wideband code-division multiple access (WCDMA), high-speed downlink packet access (HSDPA), long-term evolution (LTE), LTE-advanced (LTE-A), and so on.

Hereinafter, embodiments of the inventive concept will be described in detail.

FIG. 1 is a view for explaining a repeat environment of an interference cancellation repeater 10, according to an embodiment of the inventive concept.

Referring to FIG. 1, the interference cancellation repeater 10 may amplify a radio frequency (RF) input signal received via a link antenna LA in a case of downlink and transmit the amplified RF input signal to a user terminal MS via a service antenna SA. The RF input signal may include a base station signal transmitted from a base station BTS and an interference signal in which signals radiated via the service antenna SA are re-input to the link antenna LA. Furthermore, the interference cancellation repeater 10 may oscillate as the base station signal and the interference signal are amplified together by a high power amplifier (not shown). The interference cancellation repeater 10 may solve the oscillation problem by including an interference canceller 130 (see FIGS. 2 and 3) capable of estimating the interference signal and canceling the same from the RF input signal on a side of the link antenna LA.

For example, as shown in FIG. 1, the interference cancellation repeater 10 may change the gain in many cases such as when intensity of the RF input signal input to the link antenna LA or the service antenna SA changes due to environmental influences as the interference cancellation repeater 10 receives signals wirelessly via the link antenna LA or the service antenna SA, when isolation between the link antenna LA and the service antenna SA changes, when an administrator changes a gain, when an administrator performs an initialization work on the interference cancellation repeater in a state in which power is first applied to the interference cancellation repeater 10 and there is no output, and then operates the interference cancellation repeater 10 normally, when an administrator stops an operation of the interference cancellation repeater 10 for an operation state change, an equipment check, repair, and the like and then operates the interference cancellation repeater 10 normally again, when saturation occurs due to failure to cancel an interference signal by an unspecified reason, and the like. For a normal operation of the interference cancellation repeater 10, a level of the changed gain needs to be adjusted to a predetermined level (for example, an optimum gain level required for the interference cancellation repeater 10). However, if a level of a current gain of the interference cancellation repeater 10 is changed to a predetermined level immediately, the interference canceller 130 (see FIGS. 2 and 3) may fail to estimate the interference signal and fail to cancel the interference signal from an input signal properly.

The interference cancellation repeater 10 according to the inventive concept, when a gain change is detected for various reasons, gradually change a level of the changed gain of the interference cancellation repeater 10 to an optimum level through a gain controller 170 so that the interference canceller 130 (see FIGS. 2 and 3) may properly cancel an interference signal. In addition, the interference cancellation repeater 10 may maintain the gain of the interference cancellation repeater 10 at the optimum level through the gain controller 170, thereby ensuring uniformity of coverage and service stability. This will be described in detail later below with reference to FIG. 2 and the like.

Meanwhile, the interference cancellation repeater 10 may amplify the RF input signal received via the service antenna SA in a case of uplink and transmit the amplified RF input signal to the base station BTS via the link antenna LA. Although not shown in FIG. 1, in the case of uplink, signals radiated via the link antenna LA may be input to the service antenna SA through a wireless environment to form an interference signal, and thus, the interference cancellation repeater 10 may oscillate as a signal of the user terminal MS and the interference signal are included in the input signals received via the service antenna SA and are amplified together by the high power amplifier. Furthermore, as described above the interference cancellation repeater 10 may change the gain for various reasons, and there is a need to adjust the gain correspondingly.

Although not shown in FIG. 1A, the interference cancellation repeater 10 may cancel the interference signal in the uplink through the interference canceller 130 (see FIGS. 2 and 3) in the downlink described above to prevent oscillation, and may adjust the gain of the interference cancellation repeater 10 through the gain controller 170 (see FIGS. 2 and 3) to secure service stability. However, the inventive concept is not limited thereto, and the interference cancellation repeater 10 may have at least one of the interference canceller and the gain controller for each of the downlink and the uplink.

Figure 2:
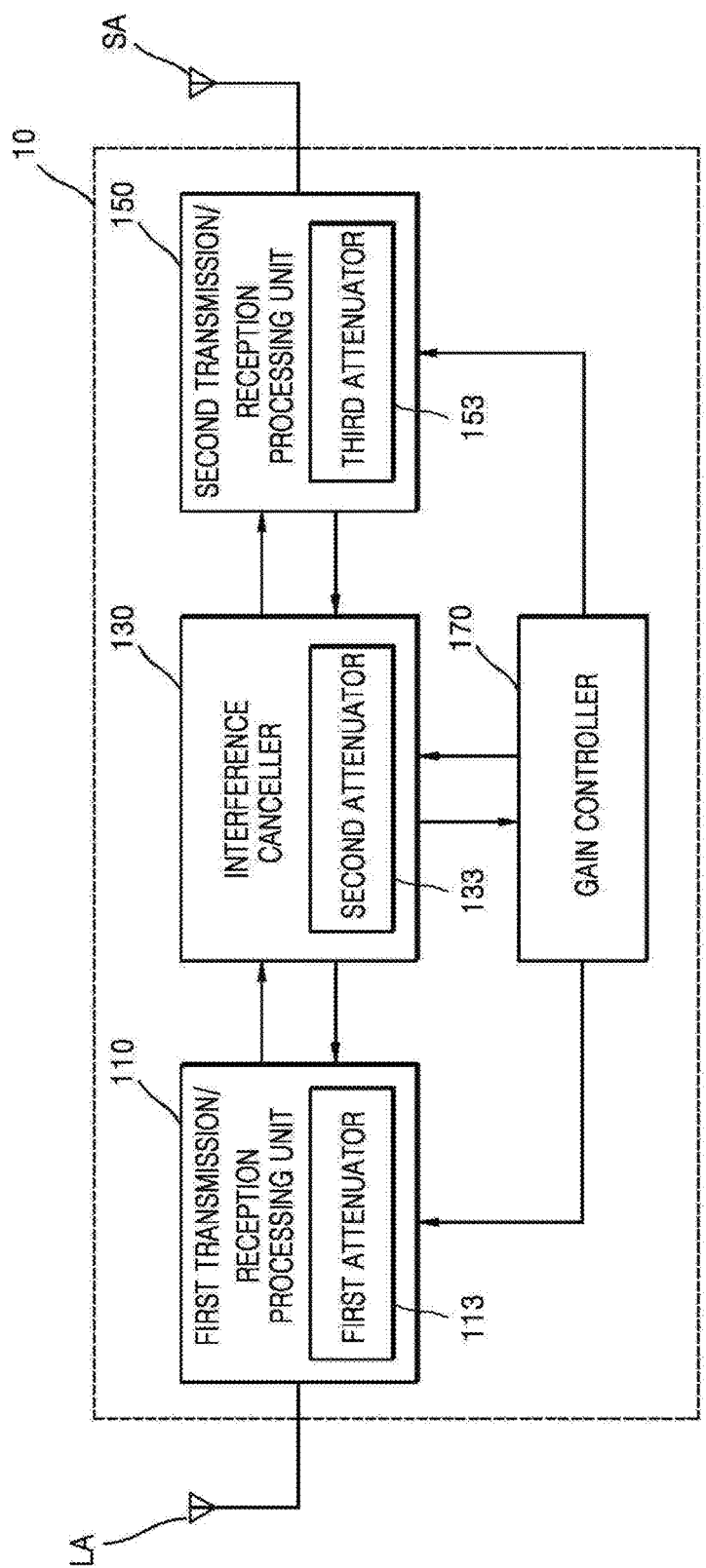
FIG. 2 is a schematic block diagram of an interference cancellation repeater, according to an embodiment of the inventive concept.

FIG. 2 is a schematic block diagram of the interference cancellation repeater 10, according to an embodiment of the inventive concept. FIG. 2 mainly describes signal processing of a downlink path in the interference cancellation repeater 10 for convenience of explanation, and signal processing of an uplink path in the interference cancellation repeater 10 corresponds to the signal processing of the downlink path. Therefore, a detailed description thereof will not be given herein. Meanwhile, FIG. 2 illustrates that the interference cancellation repeater 10 includes one link antenna LA and one service antenna SA, but the inventive concept is not limited thereto. The interference cancellation repeater 10 may include at least two link antennas and at least two service antennas. Here, the interference canceller described later below may be implemented for each signal path between a link antenna and a service antenna corresponding to each other, or may be integrally implemented for at least two signal paths. Similarly, the gain controller described later below may also be implemented for each signal path between a link antenna and a service antenna corresponding to each other, or may be integrally implemented for at least two signal paths.

Referring to FIG. 2, the interference cancellation repeater 10 may include the link antenna LA, a first transmission/reception processing unit 110, an interference canceller 130, a second transmission/reception processing unit 150, a gain controller 170, and the service antenna SA.

The first transmission/reception processing unit 110 may receive an RF input signal via the link antenna LA communicatively coupled to the base station BTS (see FIG. 1). The RF input signal may include a base station signal and an interference signal in which signals radiated via the service antenna SA are re-input to the link antenna LA.

The first transmission/reception processing unit 110 may adjust intensity of the RF input signal. The first transmission/reception processing unit 110 may include a first attenuator 113 and may adjust the intensity of the RF input signal through the first attenuator 113.

The first transmission/reception processing unit 110 may convert the RF input signal whose intensity is adjusted by the first attenuator 113 into a digital input signal and output the digital input signal.

The interference canceller 130 may output the interference canceled signal by canceling the interference signal from the output signal of the first transmission/reception processing unit 110, that is, the digital input signal. In more detail, the interference canceller 130 may estimate a signal corresponding to the interference signal based on the digital input signal from which the interference signal has been canceled. The interference canceller 130 may cancel the interference signal from the digital input signal using the estimated signal. The interference canceller 130 may output the interference canceled signal corresponding to a digitized base station signal as the digital input signal from which the interference signal has been canceled.

The interference canceller 130 may adjust intensity of the interference canceled signal. The interference canceller 130 may include a second attenuator 133 and may adjust the intensity of the interference canceled signal through the second attenuator 133.

The second transmission/reception processing unit 150 may convert an output signal of the interference canceller 130, that is, the interference canceled signal, into an RF output signal that is an analog signal.

The second transmission/reception processing unit 150 may include a third attenuator 153 and may adjust intensity of the RF output signal through the third attenuator 153. The second transmission/reception processing unit 150 may amplify the RF output signal whose intensity is adjusted by the third attenuator 153, and may transmit the amplified RF output signal via the service antenna SA communicatively coupled to the user terminal MS (see FIG. 1).

The gain controller 170 may detect a gain change of the interference cancellation repeater 10 based on the output signal of the interference canceller 130, that is, the interference canceled signal, or an administrator's control instruction, and may calculate a target gain to adjust the gain of the interference cancellation repeater 10 to a predetermined level when the gain change is detected.

The gain controller 170 may gradually change a current gain (the changed gain) of the interference cancellation repeater 10 to the calculated target gain by adjusting intensity of at least one of the RF input signal, the interference canceled signal, and the RF output signal. In more detail, the gain controller 170 may control at least one of the first attenuator 113 of the first transmission/reception processing unit 110, the second attenuator 133 of the interference canceller 130, and the third attenuator 153 of the second transmission/reception processing unit 150, thereby gradually changing the current gain of the interference cancellation repeater 10 to the calculated target gain by gradually adjusting intensity of at least one of signals input to each of the first to third attenuators 113 to 153.

Figure 3:
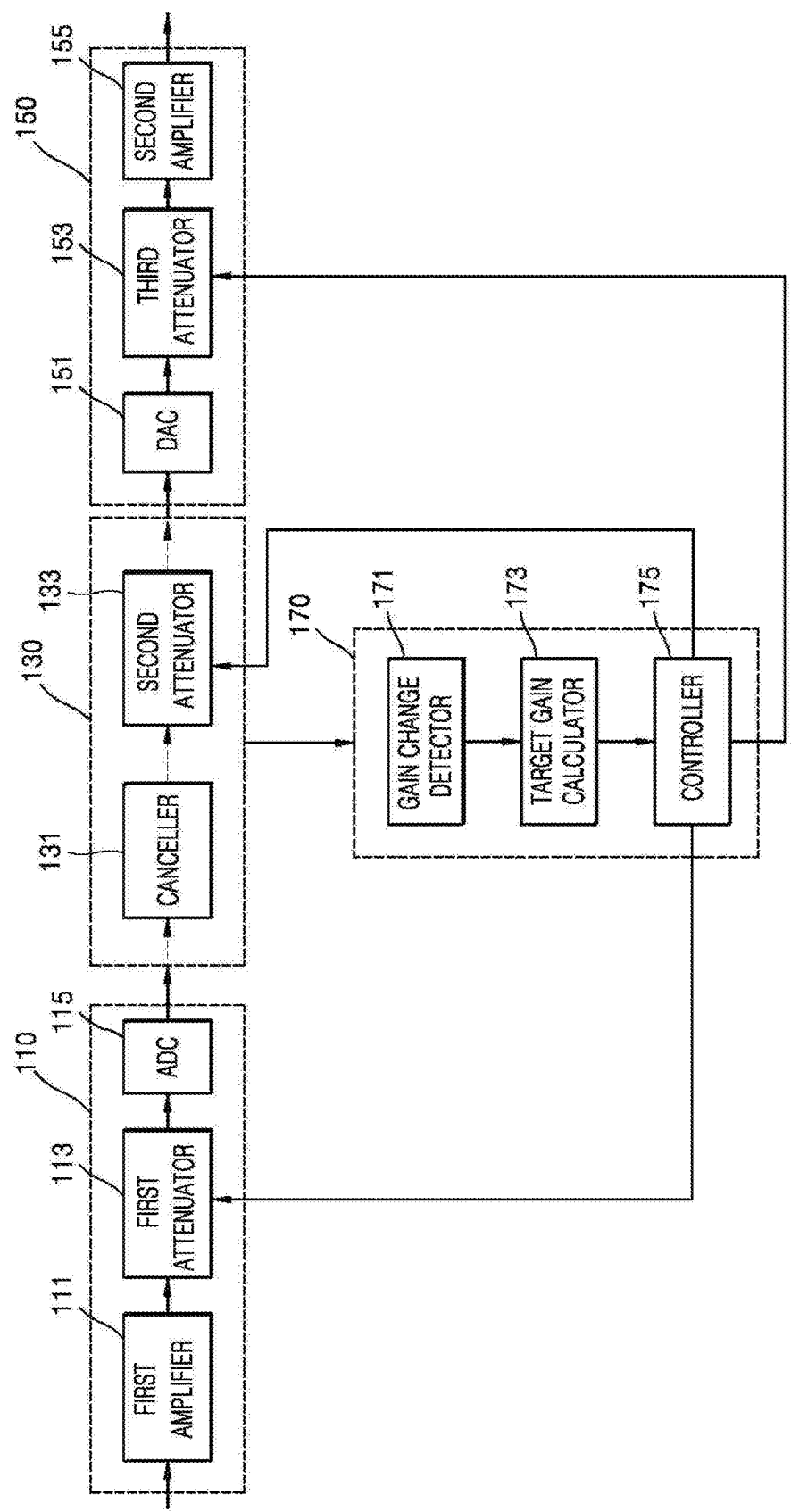
FIG. 3 is a view for explaining a detailed configuration of a portion of the interference cancellation repeater of FIG. 2.
Figure 4:
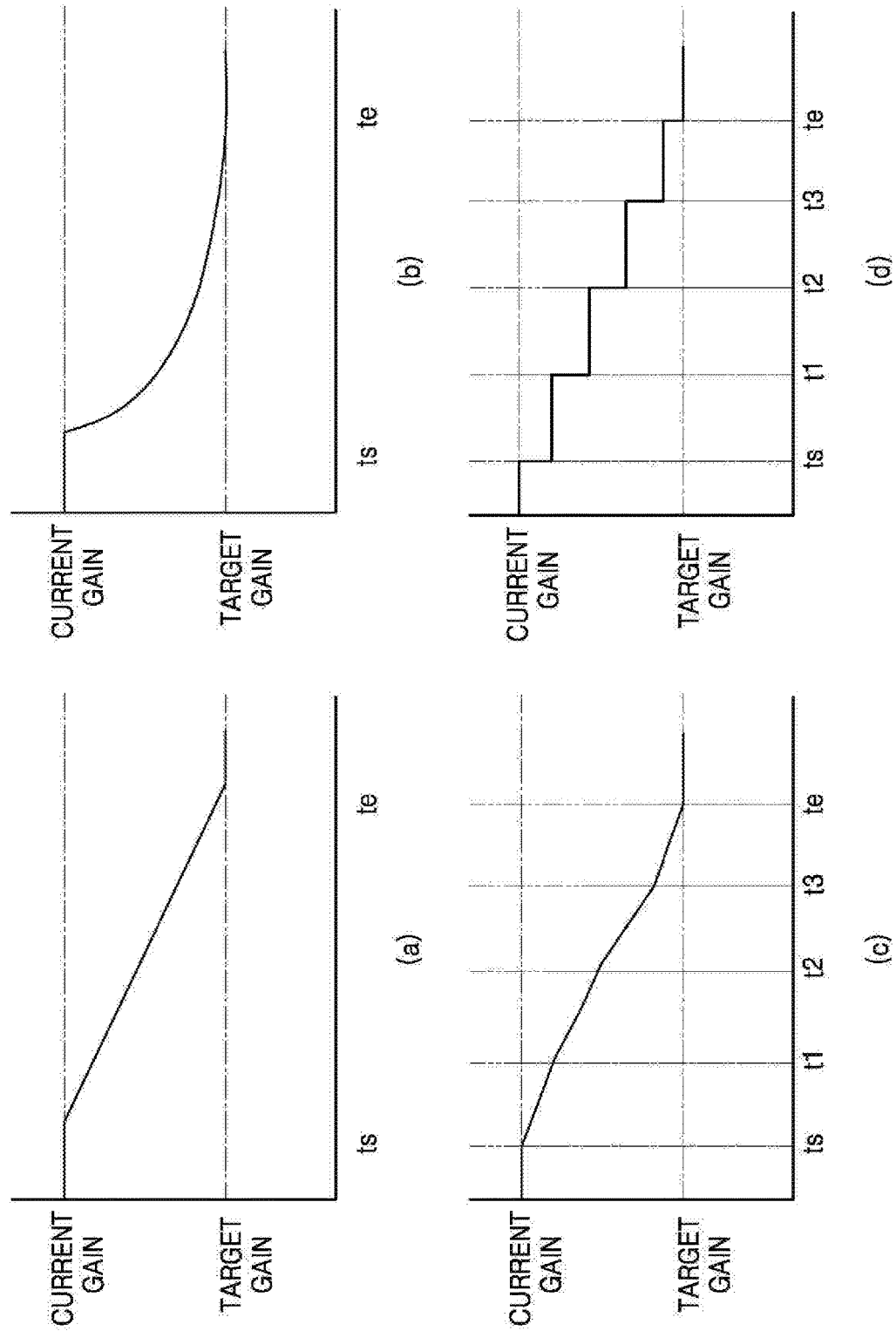
FIG. 4 is views for explaining an example of a gradual gain control of a gain controller of FIG. 2.

FIG. 3 is a view for explaining a detailed configuration of a portion of the interference cancellation repeater 10 of FIG. 2. FIG. 4 is views for explaining an example of a gradual gain control of the gain controller 170 of FIG. 2. FIGS. 3 and 4 are described with reference to FIG. 2 and repeated descriptions thereof are omitted for convenience of description. The first transmission/reception processing unit 110, the interference canceller 130, the second transmission/reception processing unit 150, and the gain controller 170 will be mainly described.

Referring to FIGS. 2 and 3, the first transmission/reception processing unit 110 may include a first amplifier 111, a first attenuator 113, and an analog-to-digital converter (ADC) 115. The first amplifier 111 may amplify the RF input signal input to the interference cancellation repeater 10 via the link antenna LA by low noise amplification, that is, by minimizing noise of the RF input signal. The first attenuator 113 may adjust intensity of the amplified RF input signal. The first attenuator 113 may be an analog attenuator. The ADC 115 may convert the intensity-adjusted RF input signal into the digital input signal.

Meanwhile, although not shown in FIG. 3, the first transmission/reception processing unit 110 may further include a filter for selecting a frequency band required for the RF input signal at a front end of the amplifier 111 and a frequency-down converter for converting the intensity-adjusted RF input signal into a signal of an intermediate frequency band between the first attenuator 113 and the ADC 115. Here, the frequency-down converter may be optionally omitted.

The interference canceller 130 may include a canceller 131 and a second attenuator 133. The canceller 131 may cancel the interference signal from the digital input signal. The canceller 131 may generate an estimated signal corresponding to the interference signal based on an output signal of the canceller 131, that is an interference canceled signal in which the interference signal has been canceled from the digital input signal, and may cancel the interference signal from the digital input signal using the generated estimated signal to output the interference canceled signal. The second attenuator 133 may adjust intensity of the interference canceled signal. Here, the second attenuator 133 may be a digital attenuator.

The second transmission/reception processing unit 150 may include a digital-to-analog converter (DAC) 151, a third attenuator 153, and a second amplifier 155. The DAC 151 may convert the output signal of the interference canceller 130, that is, the interference canceled signal, into an analog RF output signal. The third attenuator 153 may adjust intensity of the RF output signal. The third attenuator 153 may be an analog attenuator. The second amplifier 155 may amplify the intensity-adjusted RF output signal. The second amplifier 155 may include a high-power amplifier.

Meanwhile, although not shown in FIG. 3, the second transmission/reception processing unit 150 may include a frequency-up converter between the DAC 151 and the third attenuator 153 when the first transmission/reception processing unit 110 includes a frequency-down converter, wherein the DAC 151 may convert the interference canceled signal into an output signal of an intermediate frequency band, and the frequency-up converter may frequency-up convert the output signal of the intermediate frequency band into a signal of a radio frequency band to output the RF output signal. Also, although not shown in FIG. 3, the second transmission/reception processing unit 150 may further include an isolator or the like for protecting the second amplifier 155 at a rear end of the second amplifier 155.

The gain controller 170 may include a gain change detector 171, a target gain calculator 173, and a controller 175.

The gain change detector 171 may detect the gain change of the interference cancellation repeater 10 based on the output signal of the interference canceller 130, that is, the interference canceled signal.

In some embodiments, the gain change detector 171 may detect the gain change of the interference cancellation repeater 10 by measuring a change in magnitude of a signal input via the link antenna LA. The gain change detector 171 may measure the change in magnitude of the signal input via the link antenna LA through, for example, power measurement of a peak signal of the interference-canceled digital input signal, average-power measurement of the interference-canceled digital input signal, or power measurement of a signal (for example, a synchronization signal or a power-indication signal) with constant magnitude regardless of a change in a user data amount in the interference-canceled digital input signal.

In another embodiment, the gain change detector 171 may detect the gain change of the interference cancellation repeater 10 by measuring a change in isolation between the link antenna LA and the service antenna SA. Here, the gain change detector 171 may calculate a correlation degree of the interference canceled signal and the RF input signal input via the link antenna LA to measure the change in isolation.

In another embodiment, the gain change detector 171 may determine whether the interference cancellation repeater 10 is saturated or not, and detect the gain change of the interference cancellation repeater 10.

Meanwhile, according to an embodiment, the gain change detector 171 may detect the gain change of the interference cancellation repeater 10 without using the interference-canceled digital input signal. For example, the gain change detector 171 may detect the gain change of the interference cancellation repeater 10 based on an administrator's control instruction for the gain change, shutdown, and the like of the interference cancellation repeater 10, and gain change information.

The target gain calculator 173 may calculate a target gain of the interference cancellation repeater 10 when the gain change detector 171 detects the gain change of the interference canceller 10. Here, the target gain may have a value corresponding to a gain required for the interference cancellation repeater 10, i.e., an optimum gain. The optimum gain may be preset by an administrator and may be changed according to an operating environment of the interference cancellation repeater 10.

The target gain calculator 173 may calculate the target gain in consideration of at least one of magnitude of the interference canceled signal, a maximum output of the interference cancellation repeater, the isolation between the link antenna LA and the service antenna SA, and administrator's input information. That is, the target gain calculator 173 may calculate the target gain in consideration of factors corresponding to a cause of the gain change.

For example, when magnitude of the RF input signal changes and a gain of the interference cancellation repeater 10 changes, the target gain calculator 173 may calculate a target gain in consideration of a rated input size for the interference canceled signal. As another example, when the isolation between the link antenna LA and the service antenna SA changes and the gain of the interference cancellation repeater 10 changes, the target gain calculator 173 may calculate the target gain in consideration of optimum isolation required between the service antenna SA and the service antenna SA.

The controller 175 may gradually change a current gain of the interference cancellation repeater 10 to the calculated target gain. The controller 175 may adjust at least one of the RF input signal, the interference canceled signal, and the RF output signal so that the current gain of the interference cancellation repeater 10 is gradually changed. The controller 175 may control at least one of the first attenuator 113 of the first transmission/reception processing unit 110, the second attenuator 133 of the interference canceller 130, and the third attenuator 153 of the second transmission/reception processing unit 150 to adjust intensity of a signal input to each attenuator.

Further referring to FIG. 4, the controller 175 may change the current gain of the interference cancellation repeater 10 to the target gain at a constant change rate for a predetermined time as shown in FIGS. 4 (*a*) and (*b*). That is, the controller 175 linearly changes intensity of at least one of the RF input signal, the interference canceled signal, and the RF output signal so that the current gain of the interference cancellation repeater 10 may change to the target gain at a constant change rate for a predetermined time. Here, the change rate may have an integer scale (FIG. 4 (*a*)) or a log scale (FIG. 4 (*b*)).

The controller 175 may nonlinearly change the current gain of the interference cancellation repeater 10 to the target gain for a predetermined time as shown in FIGS. 4 (*c*) and (*d*). That is, the controller 175 nonlinearly changes intensity of at least one of the RF input signal, the interference canceled signal, and the RF output signal so that the current gain of the interference cancellation repeater 10 may be changed to the target gain nonlinearly for a predetermined time.

For example, the controller 175 may change the current gain of the interference cancellation repeater 10 to the target gain at different change rates in at least two of a plurality of time intervals (FIG. 4 (*c*)). As another example, the controller 175 may change the current gain of the interference cancellation repeater 10 to the target gain stepwise in a plurality of time intervals (FIG. 4 (*d*)).

As such, when the gain change of the interference cancellation repeater 10 is detected through the gain controller 170, the interference cancellation repeater 10 may gradually adjust signal intensity in an analog processing operation or a digital processing operation to gradually change a level of the gain of the interference cancellation repeater 10 to a required optimum gain level.

Therefore, the interference canceller 130 may stably cancel and output the interference signal, and the gain of the interference cancellation repeater 10, which is changed for various reasons, may be maintained constant at the optimum gain level. Thus, the interference cancellation repeater 10 may provide a stable service and constant coverage.

Figure 5:
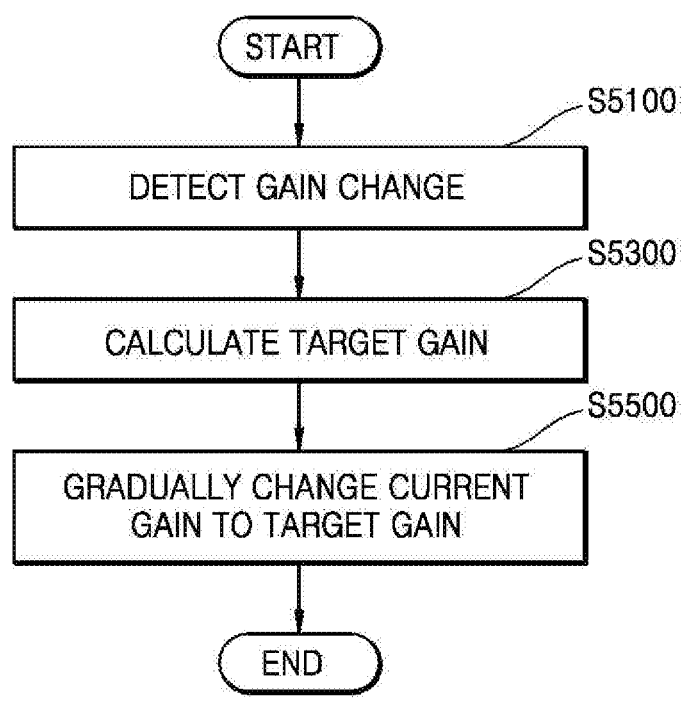
FIG. 5 is a flowchart of a method of controlling a gain of an interference cancellation repeater, according to an embodiment of the inventive concept.

FIG. 5 is a flowchart of a method of controlling a gain of an interference cancellation repeater, according to an embodiment of the inventive concept. Referring to FIG. 5, the method of controlling a gain of the interference cancellation repeater according to an embodiment of the inventive concept includes operations of time series processing in the interference cancellation repeater 10 of FIGS. 1 to 3. Therefore, even if the descriptions are omitted below, it will be understood that the contents described above with respect to the interference cancellation repeater 10 of FIGS. 1 to 3 are also applied to the method of controlling a gain of FIG. 5.

In operation S5100, the interference cancellation repeater 10 detects a gain change. The interference cancellation repeater 10 detects the gain change of the interference cancellation repeater 10 by measuring the change in magnitude of the signal input via the link antenna LA and the change in isolation between the link antenna LA and the service antenna SA.

In operation S5300, the interference cancellation repeater 10 calculates the target gain of the interference cancellation repeater 10 according to an optimum gain required for the interference cancellation repeater 10. Here, the interference cancellation repeater 10 may calculate the target gain in consideration of a cause of the gain change.

In operation S5500, the interference cancellation repeater 10 gradually adjusts intensity thereof on a signal input to the interference cancellation repeater 10 in the analog processing operation and/or the digital processing operation, and gradually changes the current gain of the interference cancellation repeater 10 to the target gain.

The interference canceller 130 may stably cancel an interference signal from an input signal as a level of a gain of the interference cancellation repeater 10 gradually changes to an optimum level. Further, as the gain of the interference cancellation repeater 10 is maintained constant at the optimum level, the interference cancellation repeater 10 may provide a stable service and constant coverage.

While the embodiments have been particularly shown and described, it will be understood by those of ordinary skill in the art that various changes in form and details may be made therein without departing from the scope of the inventive concept as defined by the appended claims.

The invention claimed is:

1. An interference cancellation repeater comprising:
a first transmission/reception processing unit configured to convert a radio frequency (RF) input signal input via a link antenna communicatively coupled to a base station into a digital input signal;
an interference canceller configured to cancel an interference signal from the digital input signal and to output an interference canceled signal;
a second transmission/reception processing unit configured to convert the interference canceled signal into an RF output signal and to amplify the RF output signal; and
a gain controller configured to detect a gain change of the interference cancellation repeater based on the interference canceled signal and to change a current gain of the interference cancellation repeater to a target gain by adjusting intensity of at least one of the RF input signal, the interference canceled signal, and the RF output signal when the gain change of the interference cancellation repeater is detected,
wherein the gain controller comprises:
a gain change detector configured to detect the gain change of the interference cancellation repeater based on the interference canceled signal;
a target gain calculator configured to calculate the target gain of the interference cancellation repeater when the gain change of the interference cancellation repeater is detected; and
a controller configured to gradually change the current gain of the interference cancellation repeater to the calculated target gain by adjusting intensity of at least one of the RF input signal, the interference canceled signal, and the RF output signal.

2. The interference cancellation repeater of claim 1, wherein
the gain controller is configured to change the current gain of the interference cancellation repeater to the target gain at a constant change rate for a predetermined time.

3. The interference cancellation repeater of claim 2, wherein
the change rate is configured to have an integer scale or a log scale.

4. The interference cancellation repeater of claim 1, wherein
the gain controller is configured to nonlinearly change the current gain of the interference cancellation repeater to the target gain for a predetermined time.

5. The interference cancellation repeater of claim 4, wherein
the predetermined time is divided into a plurality of intervals, and
the gain controller is configured to change the current gain of the interference cancellation repeater to the target gain at different change rates in at least two of the plurality of intervals.

6. The interference cancellation repeater of claim 4, wherein
the predetermined time is divided into a plurality of intervals, and
the gain controller is configured to change the current gain of the interference cancellation repeater to the target gain stepwise in the plurality of intervals.

7. The interference cancellation repeater of claim 1, wherein
the gain change detector is further configured to detect the gain change of the interference cancellation repeater based on an administrator's control instruction.

8. The interference cancellation repeater of claim 1, wherein
the target gain calculator is configured to calculate the target gain of the interference cancellation repeater based on at least one of magnitude of the interference canceled signal, a maximum output of the interference cancellation repeater, isolation between the link antenna and a user terminal, and administrator's input information.

9. The interference cancellation repeater of claim 1, wherein
the first transmission/reception processing unit comprises:
a first amplifier configured to amplify the RF input signal by low noise amplification;
a first attenuator configured to adjust intensity of the low-noise-amplified RF input signal; and
an analog-to-digital converter configured to convert the intensity-adjusted RF input signal into the digital input signal, wherein
the gain controller is configured to adjust the intensity of the RF input signal by controlling the first attenuator.

10. The interference cancellation repeater of claim 1, wherein
the interference canceller comprises:
a canceller configured to cancel the interference signal from the digital input signal and output the interference canceled signal; and
a second attenuator configured to adjust intensity of the interference canceled signal, wherein
the gain controller is configured to adjust the intensity of the interference canceled signal by controlling the second attenuator.

11. The interference cancellation repeater of claim 1, wherein
the second transmission/reception processing unit comprises:
a digital-to-analog converter configured to convert the interference canceled signal into the RF output signal;
a third attenuator configured to adjust intensity of the RF output signal; and
a second amplifier configured to amplify the intensity-adjusted RF output signal;
the gain controller is configured to adjust the intensity of the RF output signal by controlling the third attenuator.

* * * * *